(12) United States Patent
Yokokawa et al.

(10) Patent No.: US 11,577,552 B2
(45) Date of Patent: Feb. 14, 2023

(54) TIRE TREAD WITH SIPES

(71) Applicant: Compagnie Generale Des Etablissements Michelin, Clermont-Ferrand (FR)

(72) Inventors: Kazutaka Yokokawa, Tokyo (JP); Masayoshi Nomura, Tokyo (JP)

(73) Assignee: Compagnie Generale Des Etablissements Michelin, Clermont-Ferrand (FR)

( * ) Notice: Subject to any disclaimer, the term of this patent is extended or adjusted under 35 U.S.C. 154(b) by 209 days.

(21) Appl. No.: 16/772,984

(22) PCT Filed: Dec. 20, 2017

(86) PCT No.: PCT/JP2017/045689
§ 371 (c)(1),
(2) Date: Jun. 15, 2020

(87) PCT Pub. No.: WO2019/123560
PCT Pub. Date: Jun. 27, 2019

(65) Prior Publication Data
US 2020/0391556 A1      Dec. 17, 2020

(51) Int. Cl.
*B60C 11/12*           (2006.01)
*B60C 11/03*           (2006.01)

(52) U.S. Cl.
CPC ...... *B60C 11/1259* (2013.01); *B60C 11/0306* (2013.01); *B60C 11/1204* (2013.01);
(Continued)

(58) Field of Classification Search
CPC ............. B60C 11/1259; B60C 11/1281; B60C 2011/1286
See application file for complete search history.

(56) References Cited

U.S. PATENT DOCUMENTS

2011/0290393 A1    12/2011  Berger et al.

FOREIGN PATENT DOCUMENTS

| JP | 8-230418 A | 9/1996 |
| JP | 10-29412 A | 2/1998 |

(Continued)

OTHER PUBLICATIONS

Machine translation for Japan 2000-127716 (Year: 2022).*
(Continued)

*Primary Examiner* — Steven D Maki
(74) *Attorney, Agent, or Firm* — Dickinson Wright PLLC; Steven C. Hurles

(57) ABSTRACT

The tread has a contact face which is provided with a plurality of grooves opening to the contact face and a plurality of contact elements being delimited by the plurality of grooves. Each contact element has a top face constituting a part of the contact face and at least two incisions opening to the top face and extending radially inward of the contact elements. The incisions include at least one thin incision that is delimited via two opposed thin incision faces having a width t1 and at least one thick incision being delimited via two opposed thick incision faces having a width t2. The width t2 is thicker than the width t1. The at least one thick incision comprises at least one protrusion protruding from one of the thick incision face toward another thick incision face. The width t2 of the at least one thick incision is at least equal to 1.0 mm.

7 Claims, 3 Drawing Sheets

(52) U.S. Cl.
CPC ... *B60C 11/1281* (2013.01); *B60C 2011/1209* (2013.01); *B60C 2011/1286* (2013.01)

(56) References Cited

FOREIGN PATENT DOCUMENTS

| | | | |
|---|---|---|---|
| JP | 11-129709 A | | 5/1999 |
| JP | 2000-127716 A | * | 5/2000 |
| JP | 2000127716 A | | 5/2000 |
| JP | 2007-106175 A | | 4/2007 |
| JP | 2009126293 A | | 6/2009 |
| JP | 2011-088489 A | | 5/2011 |
| WO | 0160642 A1 | | 8/2001 |
| WO | WO-01/60642 A1 | * | 8/2001 |

OTHER PUBLICATIONS

Machine translation for WO 01/60642 (Year: 2022).*
International Search Report issued in PCT/JP2017/045689 dated Feb. 6, 2018.

* cited by examiner

[Fig. 1]
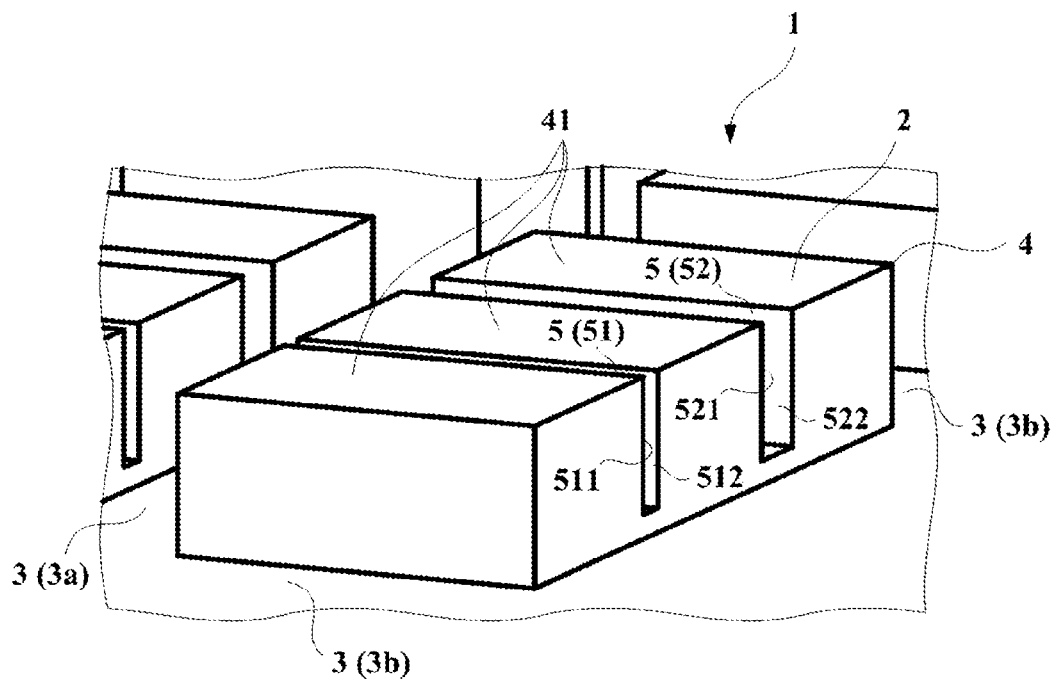
[Fig. 2]
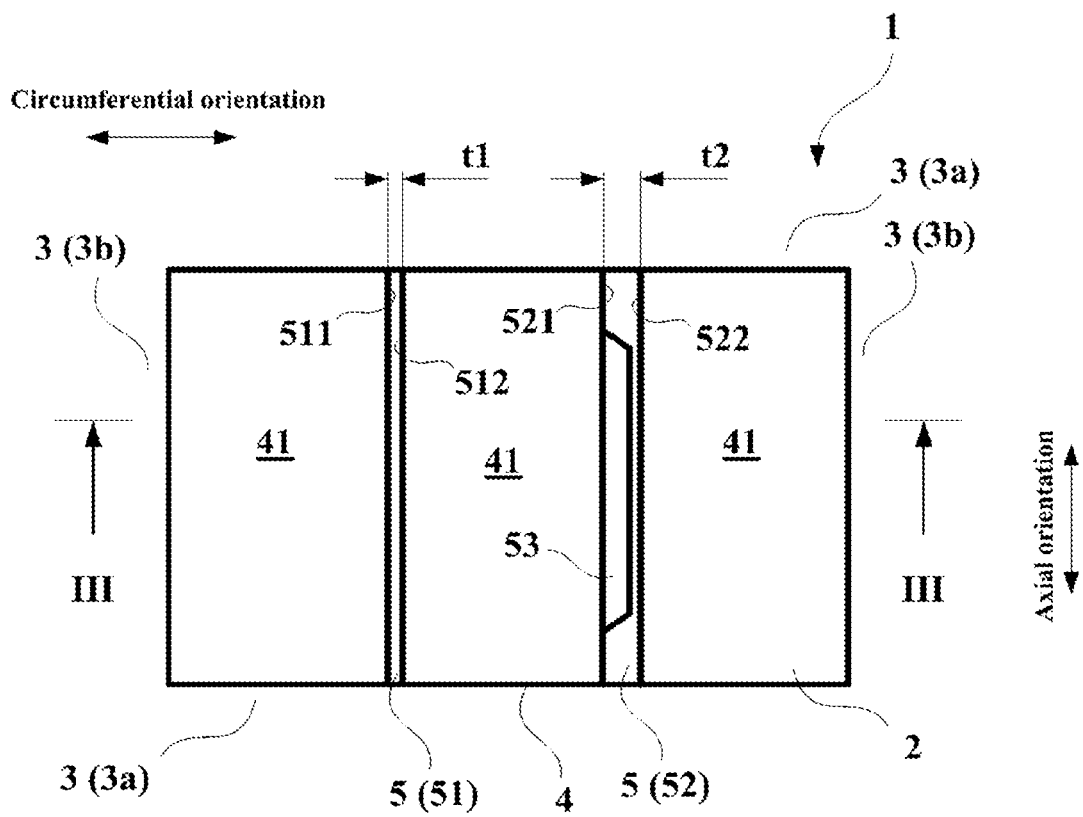

[Fig. 3]
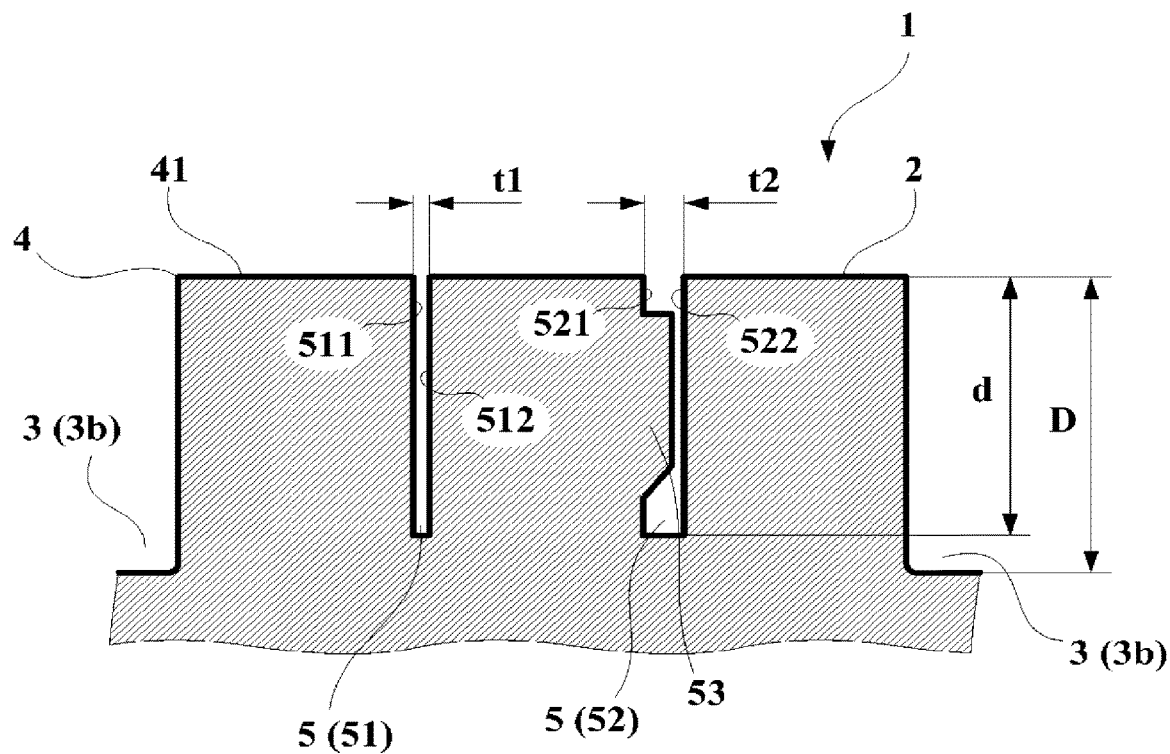
[Fig. 4]
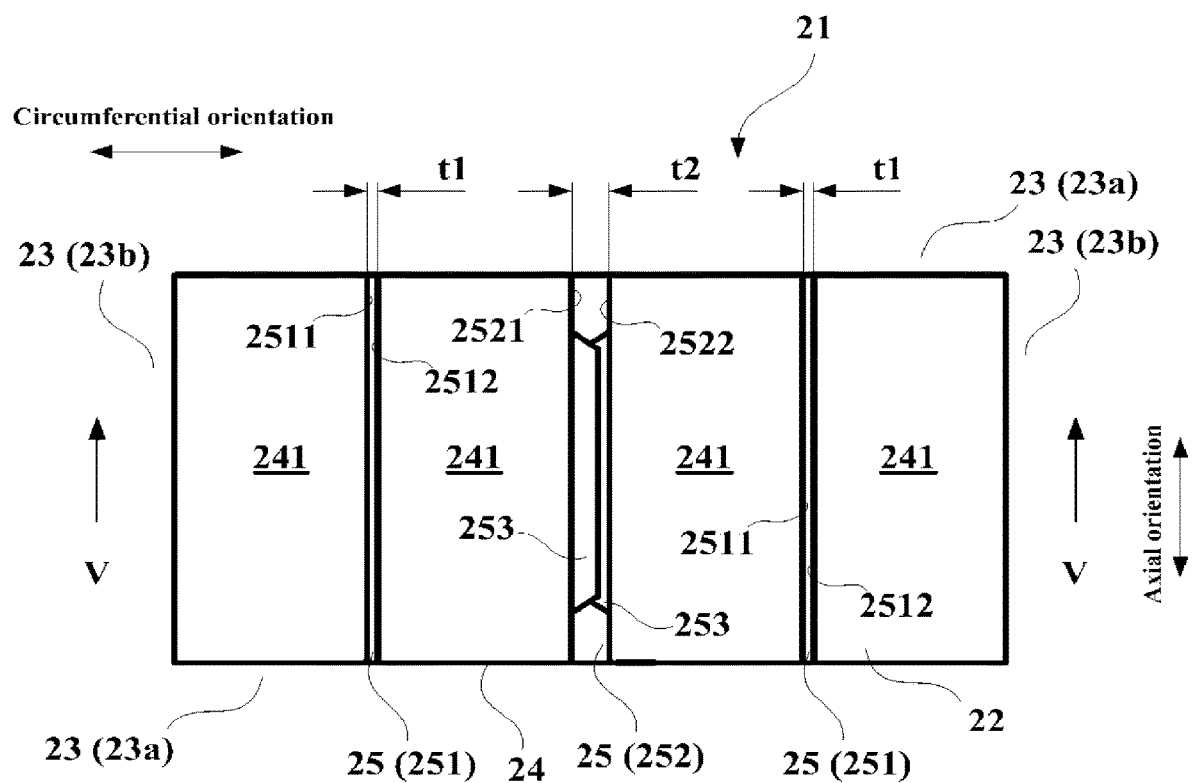

[Fig. 5]
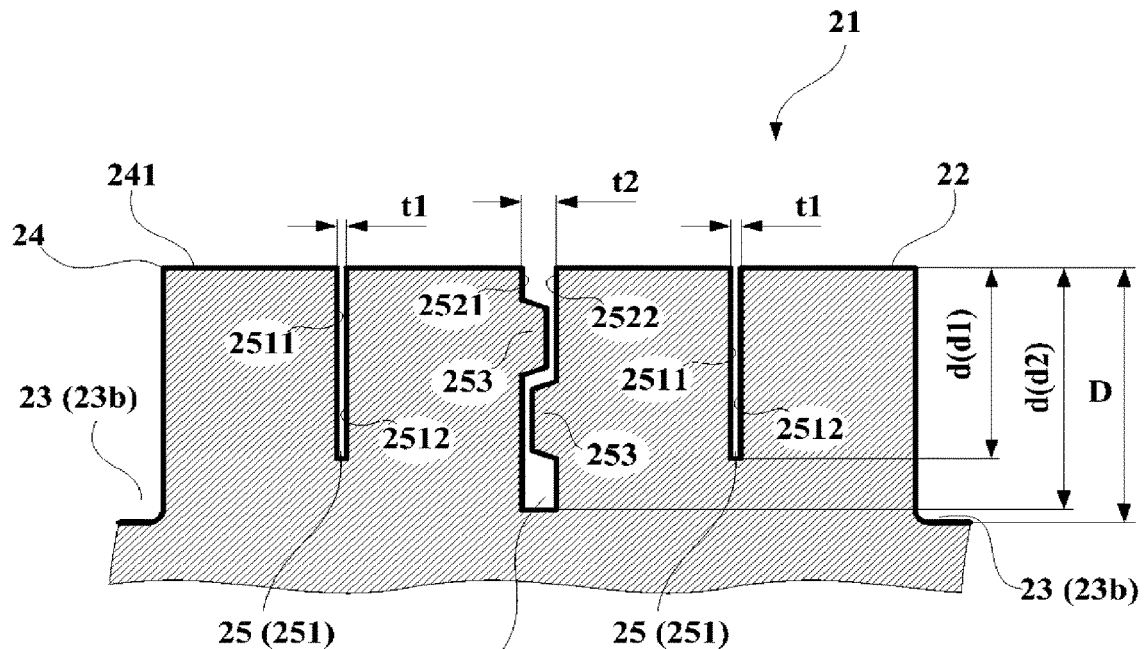
[Fig. 6]
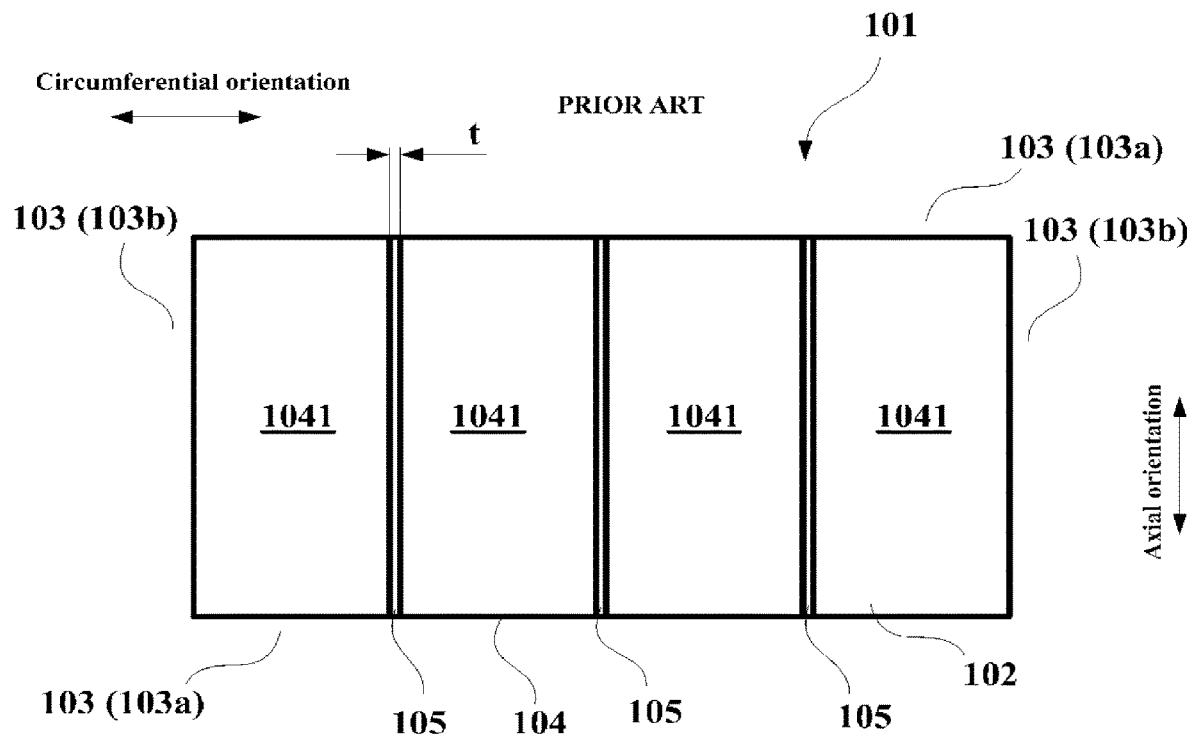

TIRE TREAD WITH SIPES

CROSS-REFERENCE TO RELATED APPLICATION

This application claims priority to and the benefit of PCT Application No. PCT/JP/045689, filed on Dec. 20, 2017, entitled "TIRE TREAD WITH SIPES".

BACKGROUND OF THE INVENTION

1. Technical Field

The present disclosure relates to a tread for a tire, in particular to a tread for a tire provided with multiple types of incisions for improving wintry performance and hydroplaning performance at the same time.

2. Related Art

In recent years to a tire so-called "studless" tire which is suitable for driving on ice covered and/or snow covered wintry (or white) road, or to a tire so-called "winter" tire or "all-season" tire which has capability to drive on wintry (or white) road for example snow covered road while maintaining high speed driving capability on normal (or black) road, there is a desire to increase performance on normal (or black) road that is not covered by ice nor snow while still improving performance on wintry (or white) road. In particular hydroplaning and/or snow slash performance improvement is desired.

In order to increase performance on hydroplaning and/or snow slash, it is known to increase a void in a tread of the tire, for example by widening a width of a groove, is effective. However as increasing the void decreases a contact area of the tread, it is also known that this technique penalizes performance on ice.

For compensating performance drawback on ice while improving hydroplaning and/or snow slash performance, increasing the void in the tread of the tire by widening a width of an incision (sipe) being provided in the tread is effective, which is also good for improving performance on snow. However it is also known that widening the width of the incision (sipe) results degradation on normal (or black) road performance. Several solutions have been proposed for improving these multiple performances.

JP2011-088489 discloses a tire having a block provided with a plurality of sipes consisting of a light & narrow incisions (0.1~0.3 mm in width and 0.50~0.60 times a maximum depth of a lateral groove in depth) and a deep & thick incisions (0.3~1.0 mm in width and deeper than the right & narrow incisions in depth) placed alternately in circumferential orientation.

JPH10-029412 discloses a tire having a block provided with multiple types of sipe with different width.

JPH11-129709 discloses a tire having a block circumferentially divided into two portions via a first sipe and each small blocks divided by the first sipe being provided with a second sipe having a width smaller than the first sipe.

JP2007-106175 discloses a tire having a block divided into a plurality of small blocks by at least one sipe, a small sipe having a depth lighter than the at least one sipe being provided near an edge of the small blocks.

However with the above arrangements, a balance between wintry (or white) road performance and normal (or black) road performance is not optimized. Therefore, it is difficult to obtain satisfactory normal (or black) road performance simultaneously with satisfactory wintry (or white) road performance.

WO01/060642 discloses a tread for a tire having a block (raised element) provided with a plurality of sipes (incisions) of a width ranging between 0.3 mm~2.0 mm, at least one sipe (incision) being provided with at least a protuberance connected through at least a connecting surface to the face where it projects for better water evacuation via the sipe (incision).

CITATION LIST

Patent Literature

PTL 1: JP2011-088489
PTL 2: JPH10-029412
PTL 3: JPH11-129709
PTL 4: JP2007-106175
PTL 5: WO01/060642

Therefore, there is a need for a tread for a tire which improves wintry (or white) road performance simultaneously with satisfactory normal (or black) road performance, in particular hydroplaning and/or snow slash performance.

Definitions

A "radial direction/orientation" is a direction/orientation perpendicular to axis of rotation of the tire. This direction/orientation corresponds to thickness orientation of the tread.

An "axial direction/orientation" is a direction/orientation parallel to axis of rotation of the tire.

A "circumferential direction/orientation" is a direction/orientation which is tangential to any circle centered on axis of rotation. This direction/orientation is perpendicular to both the axial direction/orientation and the radial direction/orientation.

A "tire" means all types of elastic tire whether or not subjected to an internal pressure.

A "tread" of a tire means a quantity of rubber material bounded by lateral surfaces and by two main surfaces one of which is intended to come into contact with ground when the tire is rolling.

A "groove" is a space between two rubber faces/sidewalls which do not contact between themselves under usual rolling condition connected by another rubber face/bottom. A groove has a width and a depth.

A "sipe", also referred to as an "incision", is a narrow cutout formed toward radially inwardly from a surface of a tread made by, for example a thin blade having a shape like a knife blade. A width of the incision at the surface of the tread is narrower than a groove, for example less than or equal to 2.0 mm. This incision may, different from the groove, be partly or completely closed when such the incision is in a contact patch and under usual rolling condition.

SUMMARY OF THE INVENTION

It is thus an object of the disclosure to provide a tread for a tire provided with multiple types of incisions, such the tread can provide improvement of wintry (or white) road performance while maintaining satisfactory level of normal (or black) road performance, in particular hydroplaning and/or snow slash performance.

The present disclosure provides a tread for a tire having a contact face intended to come into contact with ground during rolling, the tread being provided with a plurality of grooves of a depth D opening to the contact face and a plurality of contact elements being delimited by the plurality of grooves, each the plurality of contact elements having a top face constituting a part of the contact face and at least two incisions of a depth d opening to the top face and extending radially inward of the contact elements, the at least two incisions consisting of at least one thin incision being delimited via two opposed thin incision faces having a width t1 measured on the top face of the contact element when the tread being brand new and at least one thick incision being delimited via two opposed thick incision faces having a width t2 measured on the top face of the contact element when the tread being brand new, the width t2 being thicker than the width t1, the at least one thick incision comprises at least one protrusion protruding from one of the thick incision face toward another thick incision face, and the width t2 of the at least one thick incision is at least equal to 1.0 mm.

This arrangement provides improvement of wintry (or white) road performance while maintaining satisfactory level of normal (or black) road performance, in particular hydroplaning and/or snow slash performance.

Since each the plurality of contact elements having at least two incisions consisting of at least one thin incision having a width t1 and at least one thick incision having a width t2 and the width t2 being thicker than the width t1, it is possible to increase a void by the thick incision thus improving hydroplaning and/or snow slash performance while maintaining normal (or black) road performance thanks for the thin incision. Therefore, it is possible to improve wintry (or white) road performance and normal (or black) road performance simultaneously, in particular hydroplaning and/or snow slash performance.

Since the at least one thick incision comprises at least one protrusion protruding from one of the thick incision face toward another thick incision face, it is possible to maintain the width t2 of the thick incision at a level of the contact face and a stiffness of the contact elements as the protrusion would contact with the another thick incision face with loading. Therefore, it is possible to improve effectively wintry (or white) road performance and normal (or black) road performance simultaneously, in particular hydroplaning and/or snow slash performance.

Since the width t2 of the at least one thick incision is at least equal to 1.0 mm, it is possible to improve hydroplaning and/or snow slash performance and snow performance simultaneously as the at least one thick incision could act effectively not only as an extra void for hydroplaning and/or snow slash performance but also as a space for compacting snow. Therefore, it is possible to improve effectively wintry (or white) road performance and normal (or black) road performance simultaneously, in particular hydroplaning and/or snow slash performance.

If this width t2 of the at least one thick incision is less than 1.0 mm, there is a risk that the at least one thick incision cannot act as the extra void for hydroplaning and/or snow slash performance. By setting this width t2 of the at least one thick incision at least equal to 1.0 mm, it is possible to improve effectively wintry (or white) road performance and normal (or black) road performance simultaneously, in particular hydroplaning and/or snow slash performance.

In another preferred embodiment, the contact element comprises at least two thin incisions and at least one thick incision, and the at least two thin incisions are located closer to the grooves circumferentially relative to the at least one thick incision.

According to this arrangement, it is possible to prevent stone retained in the incision as the thin incisions located closer to the grooves circumferentially relative to the at least one thick incision are difficult to open compare to the thick incision, thus endurance of the contact element provided with the incisions can be improved.

In another preferred embodiment, the thick incision has at least two protrusions.

According to this arrangement, it is possible to maintain effectiveness of the thick incision provided with protrusions for a long time in case at least two protrusions are distributed radially, or it is possible to increase a degree of freedom of design of the tread and to improve the performance of such the tread in various situations (for example, for braking and for acceleration) in case at least two protrusions are distributed axially.

In another preferred embodiment, the at least two protrusions are each protruding from different thick incision faces, and the at least two protrusions have overlapping in plan view of the contact element and the at least two protrusions have no overlapping in side view of the contact element.

According to this arrangement, it is possible to increase block stiffness by creating a contact between protrusions in the same thick incision with loading.

In another preferred embodiment, the width t1 of the thin incision is at most equal to 0.6 mm.

If this width t1 of the thin incision is more than 0.6 mm, there is a risk that the thin incision decreases block stiffness too much thus degrades wintry (or white) road performance especially on ice. By setting this width t1 of the thin incision at most equal to 0.6 mm, it is possible to improve effectively wintry (or white) road performance and normal (or black) road performance simultaneously, in particular hydroplaning and/or snow slash performance.

This width t1 of the thin incision is preferably at most equal to 0.5 mm, more preferably at most equal to 0.4 mm and still more preferably at most equal to 0.3 mm.

In another preferred embodiment, a distance between adjacent incisions measured normal to the at least one thick incision on the contact face when the tread is brand new is at least equal to 4.5 mm.

If this distance is less than 4.5 mm, there is a risk that block stiffness would be decreased too much thus degrades wintry (or white) road performance especially on ice. By setting this distance at least equal to 4.5 mm, it is possible to improve effectively wintry (or white) road performance and normal (or black) road performance simultaneously, in particular hydroplaning and/or snow slash performance.

The distance between adjacent incisions measured normal to the at least one thick incision on the contact face when the tread is brand new is preferably at least equal to 4.8 mm, more preferable at least equal to 5.0 mm and still more preferably at least equal to 5.2 mm and at most equal to 10.0 mm.

In another preferred embodiment, the depth d of the at least two incisions is at least equal to 70% of the depth D of the plurality of the grooves.

If this depth d of the at least two incisions is less than 70% of the depth D of the plurality of the grooves, there is a risk that improved wintry (or white) road performance and normal (or black) road performance do not last long. By setting this depth d of the at least two incisions at least equal to 70% of the depth D of the plurality of the grooves, it is possible to improve effectively wintry (or white) road performance and normal (or black) road performance simultaneously, in particular hydroplaning and/or snow slash performance for longer time.

This depth d of the at least two incisions is preferably at least equal to 75% of the depth D of the plurality of the grooves, more preferably at least equal to 80% and at most equal to 95% of the depth D of the plurality of the grooves.

ADVANTAGEOUS EFFECTS OF INVENTION

According to the arrangements described above, it is possible to provide a tread for a tire provided with multiple types of incisions, such the tread can provide improvement of wintry (or white) road performance while maintaining satisfactory level of normal (or black) road performance, in particular hydroplaning and/or snow slash performance.

BRIEF DESCRIPTION OF DRAWINGS

Other characteristics and advantages of the disclosure arise from the description made hereafter in reference to the annexed drawings which show, as nonrestrictive examples, the embodiment of the disclosure.

In these drawings:

FIG. 1 is a schematic perspective view of a portion of a tread for a tire according to a first embodiment of the present disclosure;

FIG. 2 is a schematic plan view of a portion of a tread for a tire according to the first embodiment of the present disclosure;

FIG. 3 is a schematic cross sectional view taken along line III-III in FIG. 2;

FIG. 4 is a schematic plan view of a portion of a tread for a tire according to a second embodiment of the present disclosure;

FIG. 5 is a schematic cross sectional view taken along line V-V in FIG. 4;

FIG. 6 is a schematic plan view of a portion of a tread according to prior art;

DETAILED DESCRIPTION OF EMBODIMENTS

Preferred embodiments of the present disclosure will be described below referring to the drawings.

A tread 1 for a tire according to a first embodiment of the present disclosure will be described referring to FIGS. 1, 2 and 3.

FIG. 1 is a schematic perspective view of a portion of a tread for a tire according to a first embodiment of the present disclosure. FIG. 2 is a schematic plan view of a portion of a tread for a tire according to the first embodiment of the present disclosure. FIG. 3 is a schematic cross sectional view taken along line III-III in FIG. 2.

The tread 1 is a tread for a tire having dimension 225/45R17 and comprises a contact face 2 intended to come into contact with the ground during rolling, and a plurality of grooves 3 of a depth D (shown in FIG. 3) opening to the contact face 2. The plurality of grooves 3 include circumferential grooves 3a extending generally in circumferential orientation (as indicated in FIG. 2) and lateral grooves 3b extending generally in axial orientation (as indicated in FIG. 2). The plurality of grooves 3 (the circumferential grooves 3a and the lateral grooves 3b) are delimiting a plurality of contact elements 4. Each the plurality of contact elements 4 having a top face 41 constituting a part of the contact face 2. The contact elements 4 also comprise at least two incisions 5 of a depth d (shown in FIG. 3) opening to the top face 41 and extending radially inward of the contact elements 4.

As shown in FIG. 1, the at least two incisions 5 consisting of at least one thin incision 51 being delimited via two opposed thin incision faces 511, 512 having a width t1 (shown in FIG. 2) measured on the top face 41 of the contact element 4 when the tread 1 being brand new, and at least one thick incision 52 being delimited via two opposed thick incision faces 521, 522 having a width t2 measured on the top face 41 of the contact element 4 when the tread 1 being brand new. The width t2 of the thick incision 52 being thicker than the width t1 of the thin incision 51.

As shown in FIG. 2, the at least one thick incision 52 comprises at least one protrusion 53 protruding from one of the thick incision face 521 toward another thick incision face 522. The width t2 of the at least one thick incision 52 is at least equal to 1.0 mm. Contrary to the thick incision 52, the at least one thin incision 51 comprises no protrusion protruding from one of the thin incision face 511 (512) toward another thin incision face 512 (511), and the width t1 of the thin incision 51 is at most equal to 0.6 mm. The at least one thin incision 51 and the at least one thick incision 52 dividing the contact element 4 into three small elements substantially equally in circumferential orientation, and a distance between adjacent incisions 5 measured normal to the at least one thick incision 52 on the contact face 41 when the tread 1 is brand new is at least equal to 4.5 mm. In the present embodiment, the width t1 of the at least one thin incision 51 is 0.6 mm, and the width t2 of the at least one thick incision 52 is 1.2 mm. The protrusion 53 has a trapezoid shape in plan view of the contact element 4, axial ends of the protrusion 53 on the thick incision face 521 are both offset from the groove 3 (circumferential groove 3a), and protruding about three-quarter (¾) of the width t2 of the thick incision from the thick incision face 521 toward another thick incision face 522, and the distance between adjacent incisions 5 is 5.2 mm.

As shown in FIG. 3, the thin incision 51 and the thick incision 52 have the same depth d from the top face 41 of the contact element 4, the depth d of the incisions 5 (the thin incision 51 and the thick incision 52) is smaller than the depth D of the groove 3 (the axial groove 3b) and at least equal to 70% of the depth D of the plurality of the grooves 3. In the present embodiment, the depth D of the grooves 3 (the circumferential groove 3a and the axial groove 3b) is 9.2 mm, the depth d of the incisions 5 (the thin incision 51 and the thick incision 52) is 8.7 mm, thus the depth d of the incisions 5 is 95% of the depth D of the grooves 3.

As shown in FIG. 3, the protrusion 53 provided with the thick incision 52 extending from one of the thick incision face 521 toward another thick incision face 522 has a right trapezoid shape in a cross sectional view. A radially external part of the protrusion 53 is substantially parallel to the top face 41 of the contact element 4, a radially internal part of the protrusion 53 is extending upwardly from one of the thick incision face 521 toward another thick incision face 522.

Since each the plurality of contact elements 4 having at least two incisions 5 consisting of at least one thin incision 51 having a width t1 and at least one thick incision 52 having a width t2 and the width t2 being thicker than the width t1, it is possible to increase a void by the thick incision 52 thus improving hydroplaning and/or snow slash performance while maintaining normal (or black) road performance thanks for the thin incision 51. Therefore, it is possible to improve wintry (or white) road performance and normal (or black) road performance simultaneously, in particular hydroplaning and/or snow slash performance.

Since the at least one thick incision 52 comprises at least one protrusion 53 protruding from one of the thick incision face 521 toward another thick incision face 522, it is possible to maintain the width t2 of the thick incision 52 at a level of the contact face 41 and a stiffness of the contact elements 4 as the protrusion 53 would contact with the another thick incision face 522 with loading. Therefore, it is possible to improve effectively wintry (or white) road performance and normal (or black) road performance simultaneously, in particular hydroplaning and/or snow slash performance.

Since the width t2 of the at least one thick incision 52 is at least equal to 1.0 mm, it is possible to improve hydroplaning and/or snow slash performance and snow performance simultaneously as the at least one thick incision 52 could act effectively not only as an extra void for hydroplaning and/or snow slash performance but also as a space for compacting snow. Therefore, it is possible to improve effectively wintry (or white) road performance and normal (or black) road performance simultaneously, in particular hydroplaning and/or snow slash performance.

If this width t2 of the at least one thick incision 52 is less than 1.0 mm, there is a risk that the at least one thick incision 52 cannot act as the extra void for hydroplaning and/or snow slash performance. By setting this width t2 of the at least one thick incision 52 at least equal to 1.0 mm, it is possible to improve effectively wintry (or white) road performance and normal (or black) road performance simultaneously, in particular hydroplaning and/or snow slash performance.

As the width t1 of the thin incision 51 is at most equal to 0.6 mm, it is possible to improve effectively wintry (or white) road performance and normal (or black) road performance simultaneously, in particular hydroplaning and/or snow slash performance.

If this width t1 of the thin incision 51 is more than 0.6 mm, there is a risk that the thin incision 51 decreases block stiffness too much thus degrades wintry (or white) road performance especially on ice.

This width t1 of the thin incision 51 is preferably at most equal to 0.5 mm, more preferably at most equal to 0.4 mm and still more preferably at most equal to 0.3 mm.

As a distance between adjacent incisions 5 measured normal to the at least one thick incision 52 on the contact face 41 when the tread 1 is brand new is at least equal to 4.5 mm, it is possible to improve effectively wintry (or white) road performance and normal (or black) road performance simultaneously, in particular hydroplaning and/or snow slash performance.

If this distance is less than 4.5 mm, there is a risk that block stiffness would be decreased too much thus degrades wintry (or white) road performance especially on ice.

The distance between adjacent incisions 5 measured normal to the at least one thick incision 52 on the contact face 41 when the tread 1 is brand new is preferably at least equal to 4.8 mm, more preferable at least equal to 5.0 mm and still more preferably at least equal to 5.2 mm and at most equal to 10.0 mm.

As the depth d of the at least two incisions 5 is at least equal to 70% of the depth D of the plurality of the grooves 3, it is possible to improve effectively wintry (or white) road performance and normal (or black) road performance simultaneously, in particular hydroplaning and/or snow slash performance for longer time.

If this depth d of the at least two incisions 5 is less than 70% of the depth D of the plurality of the grooves 3, there is a risk that improved wintry (or white) road performance and normal (or black) road performance do not last long.

This depth d of the at least two incisions 5 is preferably at least equal to 75% of the depth D of the plurality of the grooves 3, more preferably at least equal to 80% and at most equal to 95% of the depth D of the plurality of the grooves 3.

A shape of the at least two incisions 5, not only the thin incision 51 but also the thick incision 52, may be curved, waved, zig-zagged or combination of these shapes including straight shape, and not only a shape on the contact face 2 but also a shape in radial orientation. A shape of the at least one thin incision 51 and the at least one thick incision 52 may be the same except their width, or may be different.

The contact elements 4 may have an angle against circumferential orientation, and may have various shapes other than rectangle. The incisions 5 may also have an angle against circumferential orientation, and may open to only one groove 3, or may open to no groove 3.

The protrusion 53 of the thick incision 52 may have various shapes other than (right) trapezoid shape on plan view or in radial orientation while maintaining an ability to contact with another thick incision face 522. The protrusion 53 may extend on one of the thick incision face 521 until the grooves 3. The protrusion 53 may protrudes from one of the thick incision face 521 toward another thick incision face 522 on an amount at least equal to 51%, preferably at least equal to 60% and more preferably at least equal to 70% of the width t2 of the thick incision 52.

A tread 21 for a tire according to a second embodiment of the present disclosure will be described referring to FIG. 4 and FIG. 5. FIG. 4 is a schematic plan view of a portion of a tread for a tire according to a second embodiment of the present disclosure. FIG. 5 is a schematic cross sectional view taken along line V-V in FIG. 4. The constitution of the second embodiment is similar to that of the first embodiment other than the arrangement shown in FIGS. 4 & 5, thus description will be made referring to FIGS. 4 & 5.

In the second embodiment, the tread 21 having a contact face 22 is provided with a plurality of grooves 23 of a depth D (shown in FIG. 5) opening to the contact face 22. The plurality of grooves 23 include circumferential grooves 23a extending generally in circumferential orientation and lateral grooves 23b extending generally in axial orientation. The plurality of grooves 23 (the circumferential grooves 23a and the lateral grooves 23b) are delimiting a plurality of contact elements 24.

As shown in FIG. 4, the contact element 24 comprises a plurality of incisions 25, at least two thin incisions 251 and at least one thick incision 252, and the at least two thin incisions 251 are located closer to the grooves 23 circumferentially relative to the at least one thick incision 252.

As shown in FIG. 4, the thick incision 252 has at least two protrusions 253, each protrusions 253 protruding from different thick incision faces 2521, 2522, and the at least two protrusions 253 have overlapping in plan view of the contact element 24 and the at to least two protrusions 253 have no overlapping in side view of the contact element 24 (shown in FIG. 5). Contrary to the thick incision 252, the two thin incisions 251 have no protrusion protruding from thin incision faces 2511, 2512.

As shown in FIG. 5, two protrusions 253 provided with the thick incision 252 are offset in radial orientation, and have both trapezoid shapes. A width t2 of the thin incision 252 being thicker than a width t1 of the thin incisions 251. A depth d (d2) of the thick incision 252 is deeper than a depth d (d1) of the two thin incisions 251. In this present embodiment, the width t1 of the thin incision 251 is 0.4 mm, the width t2 of the thick incision 252 is 1.3 mm, the depth d1 of the thin incision 251 is 7.4 mm and the depth d2 of the thick incision 252 is 8.3 mm.

As the contact element 24 comprises at least two thin incisions 251 and at least one thick incision 252, and the at least two thin incisions 251 are located closer to the grooves 3 circumferentially relative to the at least one thick incision 252, it is possible to prevent stone retained in the incision 25 as the thin incisions 251 located closer to the grooves 3 circumferentially relative to the at least one thick incision 252 are difficult to open compare to the thick incision 252, thus endurance of the contact element 24 provided with the incisions 25 can be improved.

As the thick incision 252 has at least two protrusions 253, it is possible to maintain effectiveness of the thick incision 252 provided with protrusions 253 for a long time in case at least two protrusions 253 are distributed radially, or it is possible to increase a degree of freedom of design of the tread 1 and to improve the performance of such the tread 1 in various situations (for example, for braking and for acceleration) in case at least two protrusions 253 are distributed axially.

As the at least two protrusions 253 are each protruding from different thick incision faces 2521, 2522, and the at least two protrusions 253 have overlapping in plan view of the contact element 24 and the at least two protrusions 253 have no overlapping in side view of the contact element 24, it is possible to increase block stiffness by creating a contact between protrusions 253 in the same thick incision 252 with loading.

The two thin incisions 251 may have different width t1 each other, may have different depth d1 each other, and/or may have different shape each other.

The depth d1 of the thin incision 251 may be equal to the depth d2 of the thick incision 252, may be deeper than the depth d2 of the thick incision 252.

The disclosure is not limited to the examples described and represented and various modifications can be made there without leaving its framework.

FIG. 6 is a schematic plan view of a portion of a tread according to prior art. In this FIG. 6, the tread 101 comprises a contact face 102 intended to come into contact with ground during rolling, and a plurality of grooves 103 comprising a circumferential groove 103a extending in circumferential orientation and an axial groove 103b extending in axial orientation, the plurality of grooves 103 delimitating a contact element 104. The contact element 104 being provided with 3 incisions 105 of a width t opening to a top face 1041 and extending in radial orientation (not shown). Each the incisions 105 have substantially equal thin width. The 3 incisions 105 dividing the contact element 104 substantially equally into 4 portions in circumferential orientation. The incisions 105 are provided without protrusion(s).

EXAMPLES

In order to confirm the effect of the present disclosure, one type of block sample of Example to which the present disclosure is applied and other types of block samples of Reference and Comparative Example were investigated using simulation (finite element method) employing commercially available computer software.

The Example 1 was a block model as described in the above second embodiment having the thin incision of width of 0.4 mm and the thick incision of width of 1.2 mm with protrusions. The Reference was a block model having only one type of incision of a width of 0.4 mm as described in the above prior art, the Comparative Example 1 was a block model having only one type of incision of a width of 1.2 mm without protrusions, the Comparative Example 2 was a block model having only one type of incision of a width of 0.68 mm without protrusions, the Comparative Example 3 was a block model having the thin incision of width of 0.4 mm and the thick incision of width of 1.2 mm without protrusions. All the Example, Reference and Comparative Examples were designed as to be made of the same rubber material, and had the same block width of 20 mm, groove depth D of 8.5 mm and incision depth d of 7.0 mm and distance between adjacent incisions measured normal to the thick incision (or an incision placed at a center of the block if there is no thick incision) on the contact face when the tread is brand new of 5.0 mm.

A void ratio on the contact face of the block was calculated as a representative of hydroplaning and/or snow slash performance. Also with suitable loading applied to the block models and with 1.0 mm sharing in circumferential orientation, block stiffness was calculated as a representative of on normal (or black) road performance. The results are shown in table 1. In this table 1, results are represented by an index of 100 for Reference, higher the number indicates better the performance.

TABLE 1

|  | Reference | Comparative Example 1 | Comparative Example 2 | Comparative Example 3 | Example |
|---|---|---|---|---|---|
| (Thin) incision width (mm) | 0.4 | 1.2 | 0.68 | 0.4 | 0.4 |
| Thick incision width (mm) | — | — | — | 1.2 | 1.2 |
| Void ratio (index) | 100 | 118 | 107 | 107 | 105 |
| Block stiffness (index) | 100 | 89 | 90 | 94 | 112 |

As seen from table 1, the Example shows improvement normal (or black) road performance including hydroplaning performance while still improving on wintry (or white) road performance such as snow slash performance.

REFERENCE SIGNS LIST

1, 21 tread
2, 22 contact face
3, 23 groove
3a, 23a circumferential groove
3b, 23b axial groove
4, 24 contact element
41, 241 top face
5, 25 incision
51, 251 thin incision
511, 512, 2511, 2512 thin incision face
52, 252 thick incision
521, 522, 2521, 2522 thick incision face
53, 253 protrusion

What is claimed is:

1. A tread for a tire having a contact face intended to come into contact with ground during rolling, the tread being provided with a plurality of grooves of a depth D opening to the contact face and a plurality of contact elements being delimited by the plurality of grooves, each of the plurality of contact elements having a top face constituting a part of the contact face and at least two incisions of a depth d opening to the top face and extending radially inward of the contact elements, the at least two incisions consisting of at least one thin incision being delimited via two opposed thin incision faces having a width t1 measured on the top face of the contact element when the tread being brand new and at least one thick incision being delimited via two opposed thick incision faces having a width t2 measured on the top face of the contact element when the tread being brand new, the width t2 being thicker than the width t1, wherein the at least one thick incision comprises at least one protrusion protruding from one thick incision face toward another thick incision face, and wherein the width t2 of the at least one thick incision is at least equal to 1.0 mm, and wherein the at least one thin incision comprises no protrusion from one of the thin incision faces towards another thin incision face.

2. The tread according to claim 1, wherein the contact element comprises at least two thin incisions and at least one thick incision, and wherein the at least two thin incisions are located closer to the grooves circumferentially relative to the at least one thick incision.

3. The tread according to claim 1, wherein the thick incision has at least two protrusions.

4. The tread according to claim 3, wherein the at least two protrusions are each protruding from different thick incision faces, and wherein the at least two protrusions have overlapping in plan view of the contact element and wherein the at least two protrusions have no overlapping in side view of the contact element.

5. The tread according to claim 1, wherein the width t1 of the thin incision is at most equal to 0.6 mm.

6. The tread according to claim 1, wherein a distance between adjacent incisions measured normal to the at least one thick incision on the contact face when the tread is brand new is at least equal to 4.5 mm.

7. The tread according to claim 1, wherein the depth d of the at least two incisions is at least equal to 70% of the depth D of the plurality of the grooves.

* * * * *